United States Patent Office 3,475,355
Patented Oct. 28, 1969

3,475,355
METHOD OF MAKING A BATTERY SEPARATOR
Erhard Decker, Quickborn, Germany, assignor to W. R. Grace & Co., Cambridge, Mass., a corporation of Connecticut
No Drawing. Filed Jan. 25, 1966, Ser. No. 522,837
Claims priority, application Germany, Jan. 29, 1965, G 42,702
Int. Cl. C08g *53/08, 53/16*
U.S. Cl. 260—2.5                     5 Claims

ABSTRACT OF THE DISCLOSURE

A microporous sheet useful, for example, as a battery separator comprises a cured microporous phenol/resorcinol/formaldehyde resin. The sheet can be prepared by condensing a mixture of phenol, resorcinol and formaldehyde in an alkaline medium, diluting the mixture with water, neutralizing and precuring the mixture by adding acid, forming the mixture into a sheet and heating to solidify the sheet under conditions which do not permit the loss of volatiles, and finally heating to 100° to 250° C. to cure the solidified sheet and evaporate the volatiles.

This invention relates to novel electrical storage battery separators and more particularly to battery separators prepared from phenol/resorcinol/formaldehyde resin.

There are several types of battery separators employed in sulfuric acid batteries to prevent direct contact between the positive and negative plates while, at the same time, permitting the passage of electrolyte. For example, separators having relatively large pores generally comprise cellulosic webs impregnated with a phenol-formaldehyde resin or a sheet of sintered polyvinyl chloride. However, such separators are not entirely satisfactory because the relatively large pore size may result in "treeing," thereby shorting out the plates or may permit antimony diffusion which results in loss of battery efficiency.

Separators possessing relatively small pore size, generally referred to as microporous separators, are also employed. Wooden separators, one example of a microporous separator, are destroyed in a relatively short time by the acid. In another example, a polyvinyl chloride separator is prepared by embedding starch or some soluble filler in the polymer mass and then digesting the starch to provide the necessary porosity. However, such a process is lengthy and costly and polyvinyl chloride when exposed to extremes of temperature exhibits thermal instability whereby the separators shrink or deform, allowing the plates to short out. Another microporous separator is prepared by coagulating an aqueous rubber latex to a jelly-like mass, hardening the curing the mass under conditions which do not allow the evaporation of the water, and subsequently evaporating the water to provide the porosity. The processing of such materials is also lengthy and costly.

A novel battery separator which possesses a relatively small pore size, e.g., less than 5 microns, has now been prepared which is not subject to the afore-mentioned disadvantages.

The novel battery separators of the present invention comprise a microporous sheet of a phenol-resorcinol/formaldehyde resin. The novel microporous sheets are prepared by condensing a phenol/resorcinol/formaldehyde resin mixture in an alkaline medium, diluting the mixture with water, neutralizing, precuring the resin by the addition of acid, providing sheets of the mixture under conditions which do not permit the evaporation of the water and subsequently evaporating the volatiles, e.g., the water and acid, and curing the resin.

After curing, the resin is thermosetting and a microporous body is formed after evaporation of the volatile components.

The novel separator is composed of 5 to 95 mole percent of resorcinol based on the phenol and 100 to 150 mole percent of formaldehyde based on the phenol and resorcinol. The amount of water which is employed as the pore-forming agent in preparing the microporous sheets is dependent upon the amount of resorcinol used. The greater the amount of resorcinol in the resin mixture, the greater the amount of water which may be used. It is preferable to employ a small amount of an inhibitor, such as acetone ethylene glycol, glycerine, ethylene glycolmonomethyl-ether or methanol to the diluted resin mixture to retain the mixture in a pourable state after the acid has been added. After the resin mixture is poured into a mold or onto a surface to provide the sheet, it solidifies rapidly when it is heated to approximately 50 to 100° C., preferably 70° C. It is essential that no significant amount of water be evaporated from the sheet during this heating step. The pore volume of the final product corresponds substantially exactly to the amount of water employed in diluting the resin mixture. A greater pore volume is not provided by larger pore size but rather by an increase in the number of pores. Therefore, since the amount of water may be increased by employing a high resorcinol content in the sheet, a greater pore volume is achieved in the final product thereby reducing the amount of resorcinol in the finished product as a result of the decrease in weight of the finished product.

If water is employed as the pore-forming agent with a phenol/formaldehyde resin, it has been found that after dilution with 50% water and the addition of acid, the resin precipitates forming an aqueous phase and a hydrophobic resin phase. It has now been discovered, unexpectedly, that such phase separation can be avoided by the use of resorcinol with the phenol and formaldehyde.

In an alternative embodiment, an inert filler and/or fibers may be employed in the separator. Such materials are added when the mixture is in the aqueous solution. Preferably they are either added to the resin mixture or are placed in the sheet-forming mold prior to the addition of the resin. As examples of suitable fillers, mention may be made of those which are insoluble in sulfuric acid such as silicon hydroxide, aluminum oxide, carbon black, coal dust, mica, kaolin, asbestos, diatomaceous earth, vermiculite, calcium silicate, aluminum polysilicate, wood flour, glass particles and barium sulfate. The use of such fillers does not impair the properties of the battery separator.

Fibers employed in the battery separator include glass, cellulose, asbestos, and synthetic fibers such as Dacron, rayon, and acrylic. The mechanical stability of the separators has been found to me improved by the use of such fibers.

Up to about 200 percent, preferably, by weight of fillers and up to about 25 percent by weight of fibers (based on the weight of the total resin) are employed in the novel battery separators.

The novel separators are sufficiently hydrophilic in themselves; however, to further enhance the hydrophilic properties of the separator, wetting agents known to the art are employed, for example, sodium alkyl benzene sulfonate, sodium lauryl sulfate, isooctyl-phenyl polyethoxyethanol, and dioctylsulfosuccinate.

It is also desirable to provide ribs on all or both sides of the battery separator. By using an appropriately shaped mold during solidification of the resin, it is possible to obtain such ribs easily during the preparation of the microporous sheet. Alternatively, ribs may be applied to the finished microporous sheet by extruding a polymeric material, e.g., polyvinyl chloride or a foamed thermoplastic polymer. The evaporation of the volatile constituents in the resin mixture, and curing the sheet is preferably accomplished in one step. The preferred temperature ranges between 100 and 250° C. with the higher end of the temperature range employed to shorten the time required. However, the temperature must be selected with the particular filler or fiber employed in mind to prevent degradation of the filler or fiber. If a volatile acid such as hydrochloric acid, sulfurous acid, or fumaric acid is employed, it can be readily evaporated with the water and the other volatile constituents. However, if the acid employed is nonvolatile or not easily volatilized, e.g., sulfuric acid, phosphoric acid, or nitric acid, the microporous sheet is preferably washed with water to remove the acid. A washing step is also desirable regardless of the acid employed in order to remove any water-soluble salts present which may interfere with the functions of the battery.

The novel separators for the present invention possess considerable advantages both in processing and performance not found in other microporous separators such as those prepared from hard rubber or polyvinyl chloride. The separators of the present invention possess greater stability and oxidation resistance than polyvinyl chloride separators. The following table illustrates comparative oxidation resistance between two commercial battery separators and a separator of the present invention.

TABLE 1

| | Decrease in weight after 72 hours storage in sulphuric acid (density 1.300) at 71° C. | Decrease in weight after 4 hours storage in a solution of 3% by weight $K_2Cr_2O_7$ in sulphuric acid (density 1.200) at 60° C. |
| --- | --- | --- |
| Hard rubber | 0% | 50% |
| Microporous PVC | 15% | 15% |
| Phenol/resorcinol/formaldehyde resin | 1.0% | 4-8% |

The electrical resistance of the separators of the present invention generally ranges between 60 to 160 milliohms per square centimeter. Pore volume generally comprises 70% by weight and higher and the size of the pores is less than 1 micron.

The following nonlimiting examples illustrate the preparation of the novel battery separators of the present invention. Unless otherwise stated, all percentages are by weight.

The pore volume reported in the examples was determined in the following manner: A piece of the microporous sheet of weight $g$ was immersed in water and then reweighed (G) after saturation. The increase in weight is $G-g$ and pore volume (in percent) =

$$\frac{G-g}{g} \times 100$$

Example 1

A 50% total solids solution was formed of 94 grams of phenol (1 mole) and 103 grams of a 35% solution of formaldehyde (1.2 mole) and 63 grams of water. Condensation was initiated by the addition of 2 grams of sodium hydroxide. After two hours, 22 grams of resorcinol (0.2 mole) and 18 grams of water were added and then 20 grams of a 35% formaldehyde solution (0.25 mole) were added slowly dropwise. During the addition of the formaldehyde, cooling was applied to the mixture to maintain the temperature below 60° C. After two and one-half hours, the resin mixture was neutralized with phosphoric acid. One gram of 39% hydrochloric acid and 2 grams of methanol were admixed with 20 grams of the neutralized phenol/resorcinol/formaldehyde resin mixture which was then poured into a mold to obtain a sheet 0.5 mm. thick. The sheet was covered tightly with a glass plate to prevent evaporation of water and the resin was heated for two minutes to about 70° C. to solidify the mix. The water-saturated resin sheet was removed from the mold and cured by heating for four minutes to 200° C. The water, hydrochloric acid, and methanol were completely evaporated during curing and a microporous sheet of phenol/resorcinol/formaldehyde resin was obtained. The sheet had a pore volume of 48 to 50%. The airflow time (time required by 62 cc. of air at 140 grams pressure to pass one square centimeter of the sheet) was between 60 and 100 minutes. The electrical resistance was found to be 130 milliohms per square centimeter.

Example 2

A microporous resin sheet was prepared according to the procedure of Example 1 except that 94 grams of phenol (1 mole), 103 grams of a 35% formaldehyde solution (1.2 moles), 63 grams of water, 110 grams of resorcinol (1 mole) with 447 grams of water were employed. One hundred and three grams of a 35% formaldehyde solution (1.2 moles) was then added dropwise. The total solids content of the resin solution was 30%. A sheet was formed and cured as described in Example 1. The pore volume was 70%, the airflow time was about 200 minutes, and the electrical resistance was 60 milliohms per square centimeter. The increased pore volume and greater airflow time indicates that the number of pores was greater than that found in the sheet of Example 1 but the size of the individual pores was smaller.

Example 3

Ninety-four grams of phenol (1 mole), 103 grams of a 35% formaldehyde solution (1.2 moles), and 63 grams of water were mixed. Sixty-six grams of resorcinol (0.6 mole) and 217 grams of water were added after which 62 grams of a 35% formaldehyde solution (0.78 mole) was added dropwise. The total solids of the mixture was 35%. One gram of concentrated hydrochloric acid and 2 grams of methanol were added after which the mixture was poured into a flat mold and heated to 70° C. in an enclosed system to avoid loss by evaporation. The thus-formed 0.5 mm. sheet was then heated for three and one-half minutes to 200 to 230° C. to cure the resin and evaporate the volatile components. The pore volume was 61 to 65%, the airflow time ranged from 120 to 150 minutes, and the electrical resistance was found to be between 90 and 130 milliohms per square centimeter.

Example 4

A microporous sheet was prepared according to the procedure of Example 2 except that 95 grams of finely divided silicon dioxide were added to the mixture. The separator showed substantially the same characteristics as the one produced in Example 2.

Example 5

A phenol/resorcinol/formaldehyde resin mixture was prepared according to the procedure of Example 1 except that 0.75 gram of hydrochloric acid and 1.5 grams of methanol were employed. The mixture was then poured into a mold for precuring which contained 1 gram of polyester fiber. The sheet was heated to 205° C. for eight minutes to cure the resin and evaporate the volatiles. The pore volume of the sheet was 45%. The separator thus prepared showed better flexibility than the separator of Example 1.

Example 6

The resin mixture prepared according to the procedure of Example 2 was blended with 20% by weight of vermiculite and 10% by weight of glass fibers (based on the resin total solids). The mixture was then poured into a mold and cured as in Example 2 to provide a microporous sheet 0.5 mm. in thickness. The pore volume of the sheet was 45 to 50%.

Example 7

To 20 grams of the resin solution prepared according to Example 3 and 3 grams of polyacrylonitrile fibers were mixed together. The mixture was then poured into a mold having a ribbed bottom and the mixture was precured by heating to about 70° C. The sheet was then cured as in Example 3 to provide a microporous sheet having ribs on one side.

It has been found, unexpectedly, that the average pore size can be controlled by varying the time of the precondensation step, that is, the time the phenol resorcinol and formaldehyde is held prior to the addition of the acid. The pore size control is illustrated in the following example.

Example 8

A solution of 200 grams of aqueous phenol formaldehyde resin solution (50% solids), 30 grams of resorcinol, 30 grams of an aqueous formaldehyde solution (35%) and 60 grams of water was prepared. After mixing, the solution was heated to 50° C. To 10 grams of the above composition was added 0.7 gram of a mixture comprising 1 part by weight of nitric acid and 1 part by weight of acetone. The resin mixture was then poured onto a mat of glass fibers and heated to about 95° C. under a glass plate to prevent evaporation of the volatiles. After two minutes, the sheet was removed and cured at 180° C. for four minutes. Three different samples were prepared according to the above procedure with the only difference being that the samples were maintained at the 50°C. temperature for 27, 32, and 55 minutes respectively. The pore volume for all the samples was 0.8 cc. free space per gram of material and the electrical resistance was 116 milliohms per square centimeter.

The following table shows the pore size of each of the above samples.

| Precondensation at 50° C. (minutes) | 90% of pores (microns) |
|---|---|
| 27 | 2–3 |
| 32 | 1–1.5 |
| 55 | 0.2–0.4 |

Although the present invention has been defined primarily in terms of a battery separator, it should be understood that the novel product may be employed wherever a microporous sheet is desired.

What is claimed is:

1. A process for the preparation of a microporous sheet particularly suitable for use as a battery separator which comprises condensing a mixture of phenol, resorcinol, and formaldehyde in an alkaline medium, diluting said mixture with an amount of water sufficient to obtain a total solids content of 10 to 75%, neutralizing the diluted mixture, precuring the neutralized mixture by the addition of acid, forming said mixture into a sheet and heating to solidify the sheeted mixture under conditions which do not permit the loss of volatile materials and then heating said mixture to 100 to 250° C. for a time sufficient to cure the resin and evaporate the volatiles.

2. The process as defined in claim 1 wherein said resorcinol is present in the amount of 5 to 95 mole percent based on the phenol and said formaldehyde is present in the range of 100 to 150 mole percent based on the phenol and resorcinol.

3. The process as defined in claim 1 wherein methanol is added to the mixture prior to precuring the mixture.

4. A process as defined in claim 1 wherein 0 to 25% by weight of fibers and 0 to 200% by weight of inert fillers are mixed with the resin solution prior to curing.

5. The process as defined in claim 1 wherein said heating to solidify the sheeted mixture under conditions which do not permit the loss of volatile materials is accomplished by heating the sheeted mixture in an enclosed system.

References Cited

UNITED STATES PATENTS

| | | |
|---|---|---|
| 2,376,653 | 5/1945 | Boyer. |
| 2,446,429 | 8/1948 | Nelson et al. |
| 2,513,274 | 7/1950 | Barkhuff. |
| 2,629,698 | 2/1953 | Sterling. |
| 2,653,139 | 9/1953 | Sterling. |
| 2,700,694 | 1/1955 | Fernald. |

MURRAY TILLMAN, Primary Examiner

M. FOELAK, Assistant Examiner

U.S. Cl. X.R.

136—146; 260—38, 54, 17.2